US007904682B2

(12) United States Patent
Boyd et al.

(10) Patent No.: US 7,904,682 B2
(45) Date of Patent: *Mar. 8, 2011

(54) COPYING WRITES FROM PRIMARY STORAGES TO SECONDARY STORAGES ACROSS DIFFERENT NETWORKS

(75) Inventors: Kenneth Wayne Boyd, Tucson, AZ (US); Kenneth Fairclough Day, III, Tucson, AZ (US); Stephen Francis Edel, Greenview, CA (US); Gregory Edward McBride, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 750 days.

This patent is subject to a terminal disclaimer.

(21) Appl. No.: 11/780,456

(22) Filed: Jul. 19, 2007

(65) Prior Publication Data

US 2009/0024812 A1    Jan. 22, 2009

(51) Int. Cl.
*G06F 12/16* (2006.01)
(52) U.S. Cl. ............... 711/162; 711/E12.103; 714/6
(58) Field of Classification Search .................. None
See application file for complete search history.

(56) References Cited

U.S. PATENT DOCUMENTS

| 5,544,347 | A | 8/1996 | Yanai et al. |
| 5,572,659 | A | 11/1996 | Iwasa et al. |
| 5,712,970 | A | 1/1998 | Arnott et al. |
| 6,199,074 | B1 | 3/2001 | Kern et al. |
| 6,308,284 | B1 | 10/2001 | LeCrone et al. |

(Continued)

FOREIGN PATENT DOCUMENTS

EP      1 589 428 A     10/2005

OTHER PUBLICATIONS

PCT International Search Report dated Feb. 16, 2009 for application No. PCT/EP2008/059305 filed Jul. 16, 2008.

(Continued)

*Primary Examiner* — Kaushikkumar Patel
(74) *Attorney, Agent, or Firm* — David W. Victor; Konrad Raynes & Victor LLP

(57) ABSTRACT

Provided are a method, system, and article of manufacture for copying writes from primary storages to secondary storages across different networks. A failure notification is communicated, using a first network protocol, from a primary device in a first group of at least one primary device and at least one corresponding primary storage managed by the at least one primary device to a control system in response to the primary device determining that a write to the primary storage cannot be copied to a corresponding secondary storage. A failure notification is communicated, using a second network protocol, from a primary device in a second group of at least one primary device and at least one corresponding primary storage managed by the at least one primary device to the control system in response to the primary device determining that a write to the corresponding primary storage cannot be copied to a corresponding secondary storage. A freeze command is received, from the control system using the first network protocol at the at least one primary device in the first group. A freeze command is received, from the control system using the second network protocol at the at least one primary device in the second group. The copying of writes from the primary storages in the first and second groups to the corresponding secondary storages is suspended in response to receiving the freeze commands.

21 Claims, 7 Drawing Sheets

U.S. PATENT DOCUMENTS

| | | |
|---|---|---|
| 7,103,884 B2 | 9/2006 | Fellin et al. |
| 7,178,055 B2 | 2/2007 | Ji et al. |
| 7,441,145 B2 | 10/2008 | Hiraiwa et al. |
| 2003/0145179 A1 | 7/2003 | Gabber et al. |
| 2003/0200325 A1* | 10/2003 | Krishnaswamy et al. .... 709/230 |
| 2004/0205152 A1 | 10/2004 | Yasuda et al. |
| 2004/0260899 A1 | 12/2004 | Kern et al. |
| 2005/0097391 A1 | 5/2005 | Boyd et al. |
| 2006/0010227 A1 | 1/2006 | Atluri |
| 2006/0015507 A1* | 1/2006 | Butterworth et al. ........... 707/10 |
| 2006/0020640 A1 | 1/2006 | Suzuki et al. |
| 2007/0156983 A1* | 7/2007 | Kern et al. .................... 711/162 |
| 2007/0168713 A1* | 7/2007 | Kern et al. ...................... 714/12 |
| 2007/0220223 A1 | 9/2007 | Boyd et al. |
| 2007/0220311 A1* | 9/2007 | Lewin et al. ....................... 714/6 |
| 2007/0288710 A1 | 12/2007 | Boyd et al. |
| 2008/0172572 A1 | 7/2008 | Beardsley et al. |
| 2009/0024812 A1 | 1/2009 | Boyd et al. |

OTHER PUBLICATIONS

U.S. Patent Application entitled "Managing the Copying of Writes from Primary Storages to Secondary Storages Across Different Networks", Serial No. unknown, filed Jul. 19, 2007, by inventors K.W. Boyd, K.F. Day III, S.F. Edel, and G.E. McBride.

Brooks, C., et al. "IBM System Storage: Planning for Heterogeneous IT Business Continuity", Document No. REDP_4063-01, from [IBM System Storage Business Continuity], Document No. SG24-6547. Redpaper of Redbooks, IBM Corporation, Copyright 2007, pp. 1-24, published Mar. 22 , 2007.

Brooks, C., et al. "IBM System Storage Business Continuity: Part 2 Solutions Guide". Redbooks, IBM Corporation, Document No. SG24-6548-00, Copyright 2007, 540 pp., Feb. 2007.

* cited by examiner

Consistency Group Member Entry

Write Log Entry

COPYING WRITES FROM PRIMARY STORAGES TO SECONDARY STORAGES ACROSS DIFFERENT NETWORKS

BACKGROUND OF THE INVENTION

1. Field of the Invention

The present invention relates to a method, system, and article of manufacture for copying writes from primary storages to secondary storages across different networks.

2. Description of the Related Art

Disaster recovery systems typically address two types of failures, a sudden catastrophic failure at a single point-in-time or data loss over a period of time. In the second type of gradual disaster, updates to volumes may be lost. To assist in recovery of data updates, a copy of data may be provided at a remote location. Such dual or shadow copies are typically made as the application system is writing new data to a primary storage device. Different copy technologies may be used for maintaining remote copies of data at a secondary site, such as International Business Machine Corporation's ("IBM") Extended Remote Copy (XRC), Coupled XRC (CXRC), Global Copy, and Global Mirror Copy.

In data mirroring systems, data is maintained in volume pairs. A volume pair is comprised of a volume in a primary storage device and a corresponding volume in a secondary storage device that includes an identical copy of the data maintained in the primary volume. Primary and secondary storage controllers may be used to control access to the primary and secondary storage devices.

In many application programs, such as database systems, certain writes cannot occur unless a previous write occurred; otherwise the data integrity would be jeopardized. Such a data write whose integrity is dependent on the occurrence of previous data writes is known as a dependent write. Volumes in the primary and secondary storages are consistent when all writes have been transferred in their logical order, i.e., all dependent writes transferred first before the writes dependent thereon. A consistency group is a collection of updates to the primary volumes such that dependent writes are secured in a consistent manner. The consistency time is the latest time to which the system guarantees that updates to the secondary volumes are consistent. The consistency group includes all dependent writes as of a point-in-time written to the remote or secondary site in the order in which they were written to the primary devices. The consistency group further has a consistency time for all data writes in a consistency group having a time stamp equal or earlier than the consistency time stamp. Consistency groups maintain data consistency across volumes and storage devices. Thus, when data is recovered from the secondary volumes, the recovered data will be consistent as of the point-in-time of the consistency group.

Consistency groups are formed within a session. All volume pairs assigned to a session will have their updates maintained in the same consistency group. Thus, the sessions are used to determine the volumes that will be grouped together in a consistency group. Consistency groups are formed within a journal device or volume. From the journal, updates gathered to from a consistency group are applied to the secondary volume. If the system fails while updates from the journal are being applied to a secondary volume, during recovery operations, the updates that did not complete writing to the secondary volume can be recovered from the journal and applied to the secondary volume.

SUMMARY

Provided are a method, system, and article of manufacture for copying writes from primary storages to secondary storages across different networks. A failure notification is communicated, using a first network protocol, from a primary device in a first group of at least one primary device and at least one corresponding primary storage managed by the at least one primary device to a control system in response to the primary device determining that a write to the primary storage cannot be copied to a corresponding secondary storage. A failure notification is communicated, using a second network protocol, from a primary device in a second group of at least one primary device and at least one corresponding primary storage managed by the at least one primary device to the control system in response to the primary device determining that a write to the corresponding primary storage cannot be copied to a corresponding secondary storage. A freeze command is received, from the control system using the first network protocol at the at least one primary device in the first group. A freeze command is received, from the control system using the second network protocol at the at least one primary device in the second group. The copying of writes from the primary storages in the first and second groups to the corresponding secondary storages is suspended in response to receiving the freeze commands.

In a further embodiment, writes to the primary storages in the first and second groups are copied such that an order of dependent writes to any of the primary storages in the first and second groups is preserved in the copy of the dependent writes to the corresponding secondary storages.

In a further embodiment, wherein the data is copied synchronously from the primary devices in the first and second groups to the corresponding secondary storages such that the writes to the primary storages in the first and second groups do not complete until acknowledgment is received that the writes have completed at the corresponding secondary storages.

In a further embodiment, a write request is received by one of the primary devices in the first group. A message is sent using the first network protocol over the first network to log the write to the control system, wherein the primary device in the first group does not copy the write to the corresponding secondary storage until receiving acknowledgment from the control system over the first network that the write was logged. A message is sent using the second network protocol over the second network to log the write to the control system, wherein the primary device in the second group does not copy the write to the corresponding secondary storage until receiving acknowledgment from the control system over the second network that the write was logged. The primary devices in the first and second groups do not copy dependent writes to their corresponding secondary storages before writes having an earlier point-in-time are copied by the primary devices in the first and second groups to their corresponding secondary storages.

In a further embodiment, a write complete message is sent over the first network to the control system using the first network protocol in response to completing copying the write to the corresponding secondary storage. A write complete message is sent over the second network to the control system using the second network protocol in response to completing copying the write to the corresponding secondary storage.

In a further embodiment, an acknowledgment is sent to the control system that the freeze command was received over the first network using the first network protocol in response to receiving the freeze command. An acknowledgment is sent to the control system that the freeze command was received over the first network using the first network protocol in response to receiving the freeze command. A run command is received from the control system using the first network protocol in response to the control system receiving the acknowledgments that the freeze command was received from all the primary devices in the first and second groups. A run command is received from the control system using the second network protocol in response to the control system receiving the acknowledgments that the freeze command was received from all the primary devices in the first and second group. Writes are completed to the corresponding primary storages in the first and second groups in response to receiving the run command. Indication is made of one completed write in a change recording data structure in response to completing the write.

In a further embodiment, the at least one primary device and primary storage in the first group comprise heterogeneous devices with respect to the at least one primary device and the at least one primary storage in the second group, and wherein the first and second groups have heterogeneous storage manager programs to perform the operations of communicating the failure notification, receiving the freeze command, and suspending the copying of the writes.

DETAILED DESCRIPTION

Figure 1:
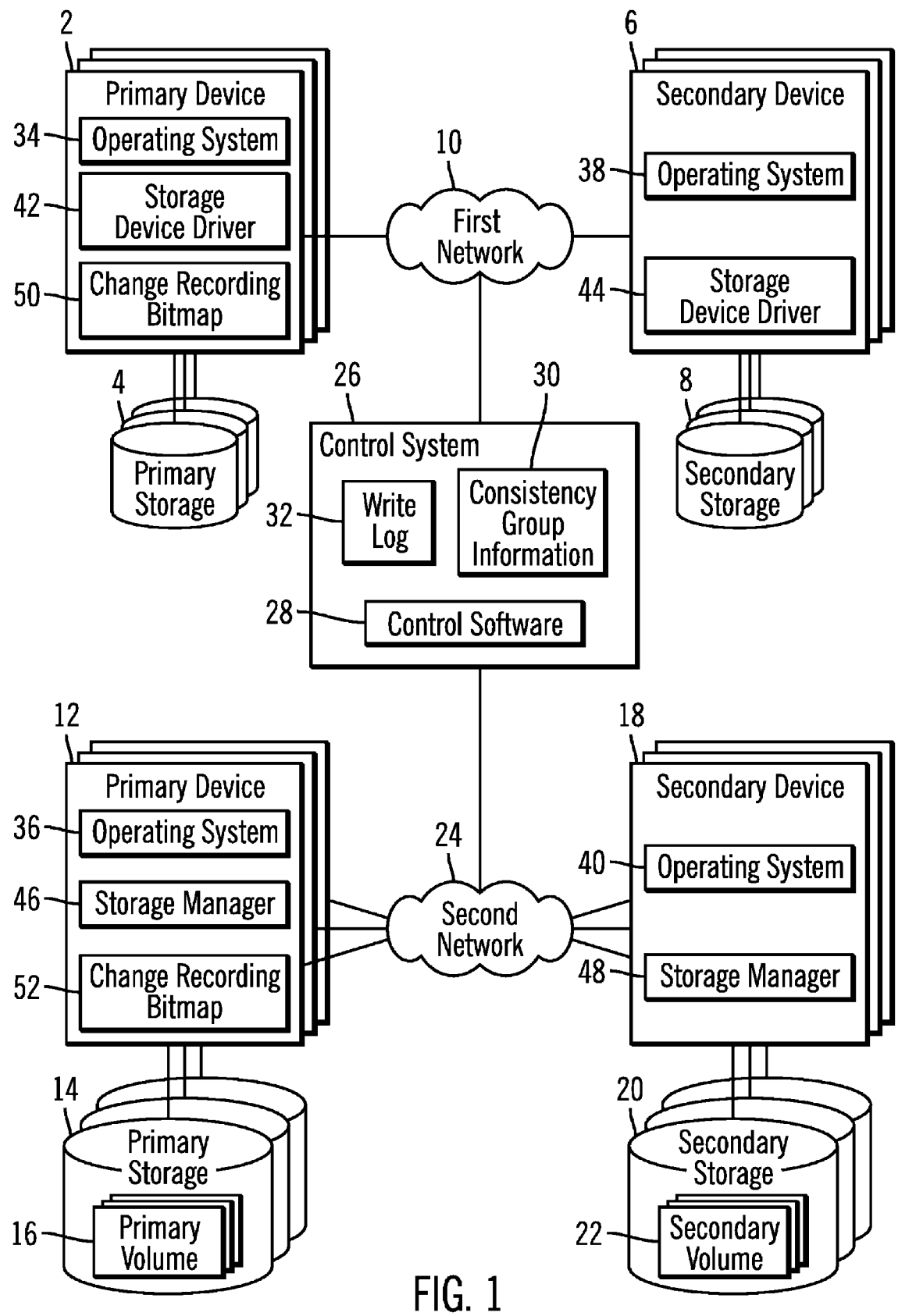
FIG. 1 illustrates an embodiment of a network computing environment.

FIG. 1 illustrates an embodiment of a network computing environment. A first group of one or more primary devices 2 each manage Input/Output (I/O) access to a primary storage 4 and each secondary device 6 manages I/O access to a secondary storage 8. Each primary device 2 mirrors writes to the coupled primary storage 4 to a corresponding secondary device 6 to store in the secondary storage 8 of the corresponding secondary device 2. The first group of primary devices 2 and corresponding secondary devices 6 communicate over a first network 10 using a first network protocol. A second group of one or more primary devices 12 each manage Input/Output (I/O) access to a primary storage 14 having one or more primary volumes 16 and each secondary device 16 manages I/O access to a secondary storage 18 having one or more secondary volumes 22. Each primary device 12 in the second group mirrors writes to the coupled volumes 16 included to a corresponding secondary device 18 to store in a corresponding secondary volume 22 of the corresponding secondary device 18. The second group of primary devices 12 and corresponding secondary devices 18 communicate over a second network 24 using a second network protocol.

A control system 26 coupled to both networks 10 and 24 includes control software 28 that manages primary storages 4 and primary volumes 16 in a single consistency group such that any writes to any of the primary storages 4 and primary volumes 16 in the different networks 10 and 24 are consistent as of a point-in-time. In this way, dependent writes to the primary storages 4 or primary volumes 16 are mirrored to their corresponding secondary storages 8 and secondary volumes 22 in the order in which they are written to the primary site. Later dependent writes anywhere at any primary device 2 and 12 in the first and second groups in the consistency group are not copied to the corresponding secondary devices 6 and 18 before an earlier write anywhere at any primary device 2 and 12 in the consistency group completes. The control software 28 is capable of using both the first and second network protocols to communicate on the first and second networks 10 and 24, respectively.

The control software 28 maintains consistency group information 30 having information on every primary volume 16/secondary volume 22 and primary storage 4/secondary storage 8 pair included in one consistency group. The control software 28 further logs information on writes to the primary volumes 16 and primary storages 4 that are pending in a write log 32. In one embodiment, the primary devices 2 and 12 write data to their primary storage 4 and primary volume 16 synchronously, such that the write does not complete until the primary devices 2 and 12 confirm that the write is successfully mirrored to the corresponding secondary storage 8, 20.

The networks 10 and 24 may comprise a Storage Area Network (SAN), Local Area Network (LAN), Intranet, the Internet, Wide Area Network (WAN), peer-to-peer network, wireless network, arbitrated loop network, etc. In the described embodiments, different network communication protocols are used to communicate on the first 10 and second 24 networks. For instance, in one embodiment, a packet or stateless communication protocol, such as Ethernet and TCP/IP, may be used to communicate on the first network 10 and a storage device communication protocol may be used to communicate on the second network 24, such as Fibre Channel, Serial Attached SCSI (SAS), etc.

The primary devices 2, 12 and secondary devices 6, 18 include an operating system 34, 36, 38, and 40, respectively. The first group of primary devices 2 and their corresponding secondary devices 8 include a storage device driver 42 and 44, respectively, to communicate with the control software 28 and manage write requests to the primary storage 4 and the mirroring of writes to the secondary storage 8. The second group of primary devices 12 and their corresponding secondary devices 18 include a storage manager 46 and 48, respectively, to communicate with the control software 28 and manage write requests to the primary storage 12 and their mirroring to the secondary storage 18. The primary device driver 42 and storage manager 46 maintain a change recording bitmap 50 and 52 to indicate writes that have completed to the primary storage 4 and volumes 16 when the connection to the corresponding secondary device 6 and 18 is unavailable, such as when operating in the FREEZE/RUN mode.

The storages 4, 8, 14, and 20 may comprise a single storage device, such as a hard disk drive, Flash Memory, etc or an array of storage devices, such as a Just a Bunch of Disks (JBOD), Network Attached Storage (NAS), hard disk drive, Direct Access Storage Device (DASD), Redundant Array of Independent Disks (RAID) array, virtualization device, tape storage, flash memory, etc. The primary devices 2 and 12 may comprise one of multiple logical partitions (LPARs) or virtual processors implemented in a single system.

In one embodiment, the primary devices 2 and corresponding secondary devices 6 in the first group may comprise a server and the storages 4 and 8 may comprise a hard disk drive local to the devices 2, 6, which connects to the device 2, 6 over an internal or external bus, serial interface, Universal Serial Bus (USB), Firewire interface, etc. Alternatively, the combination of the devices 2, 6 and storages 4, 8 in the first group may comprise a Network Attached Storage (NAS). In one embodiment, the devices 12 and 18 in the second group may comprise an enterprise storage server that manages access to a storage system 14 and 20 comprising interconnected storage devices implementing multiple logical volumes 16 and 22, such as a RAID array, JBOD, etc.

Further, in one embodiment, the one or more operating systems 34, 38 and/or storages 4, 8 used with the devices 2, 6 in the first group are heterogeneous with respect to the operating systems 36, 40 and/or storages 14, 20 used with the devices 12 and 18 in the second group. In one embodiment, the storage manager code used to manage writing and mirroring data are implemented in a device driver 42 for the attached storage 4, 8. In one embodiment, the storage manager code 46 and 48 may comprise a combination of hardware and software used in an enterprise storage server.

Figure 2:
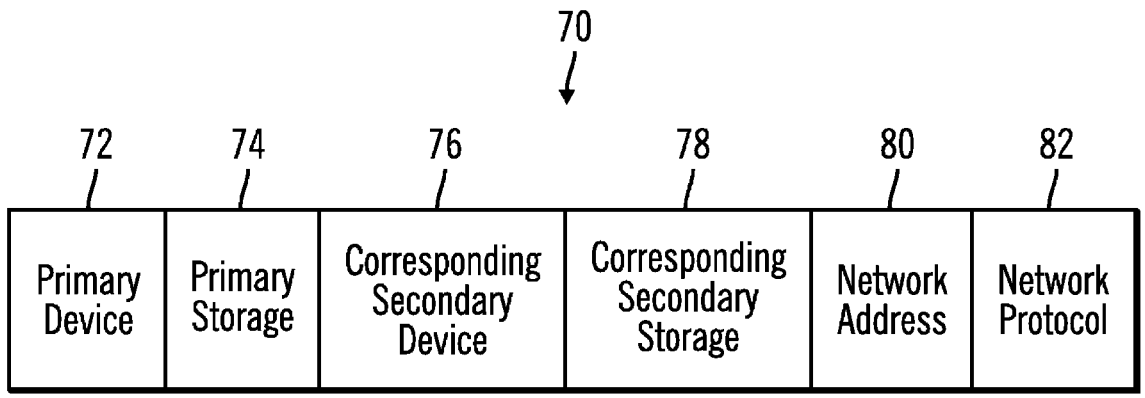
FIG. 2 illustrates an embodiment of consistency group member information.

FIG. 2 illustrates an example of information that may be included in a consistency group member entry 70 in the consistency group information 30 for a primary/secondary storage pair managed in the consistency group. The entry 70 includes a primary device 72 managing access to a primary storage 74 in the consistency group, a secondary device 76 managing access to a corresponding secondary storage 78 to which the writes to the primary storage 74 are mirrored, a network address 80 of the primary device 72 and a network protocol 82 used to communicate with the primary device 72.

Figure 3:
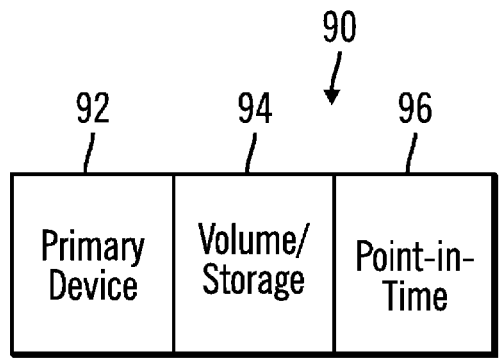
FIG. 3 illustrates an embodiment of write log entry information.

FIG. 3 illustrates an example of information that may be included in a write log entry 90 in the write log 32, including a primary device 90 performing the write to a primary storage 92 and a point-in-time of the write.

Figure 4:
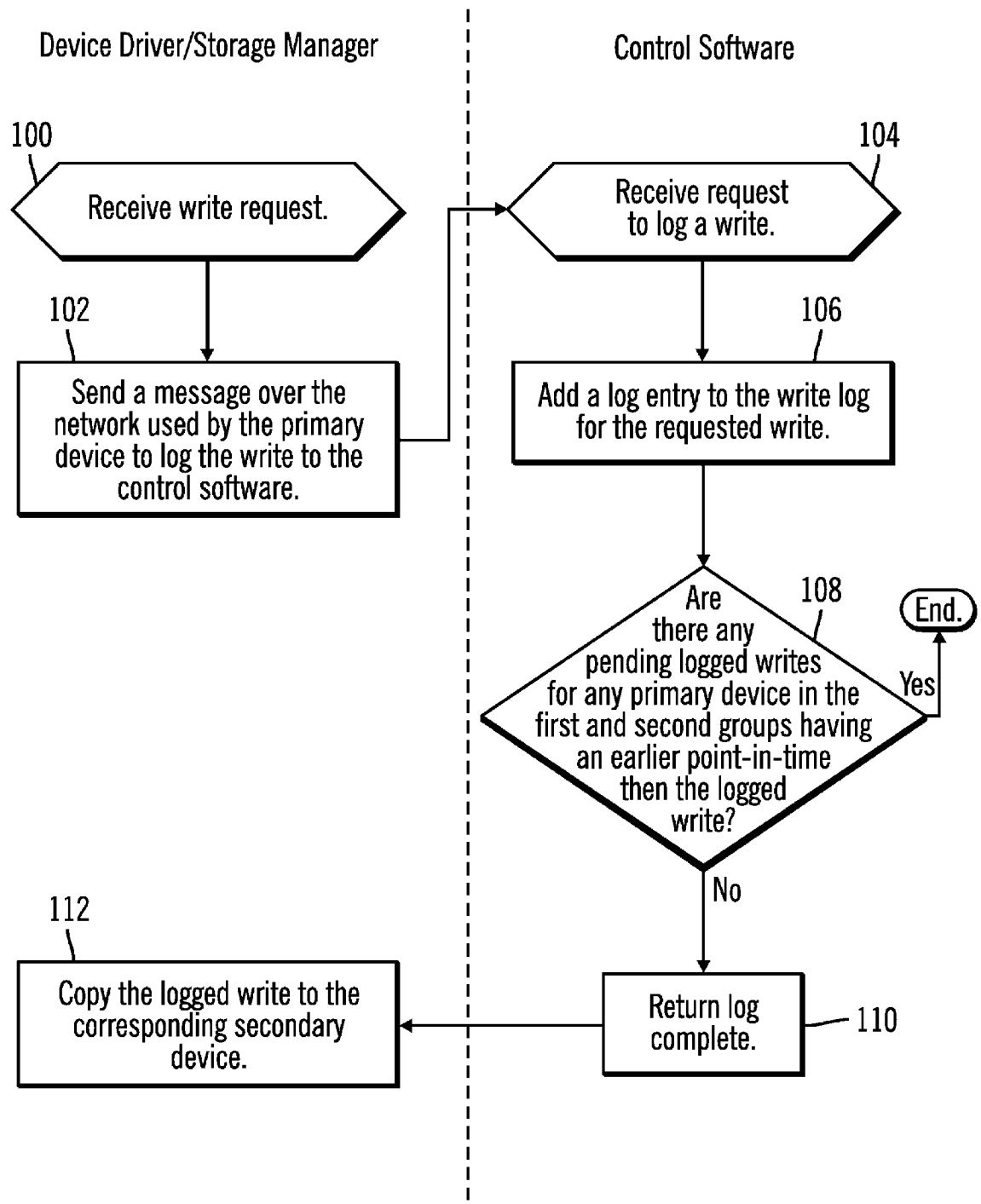
FIG. 4 illustrates an embodiment of operations to process a write request.

FIG. 4 illustrates an embodiment of operations performed by the device driver 42 and storage manager 46 in the primary devices 2, 12 in the first and second groups and the control software 28 to process a write request. Upon receiving (at block 100) a write request, the device driver 42/storage manager 46 sends (at block 102) a message over the network 10 or 24 used by the primary device to log the write to the control software 28. In response to receiving (at block 104) the message to log the write, the control software 28 adds (at block 106) a log entry 90 (FIG. 3) to the write log 32 for the requested write. If (at block 108) there are no pending logged writes for any primary device in the first and second groups having an earlier point-in-time 96, then the control software 28 returns (at block 110) log complete. Otherwise, if (at block 108) there are pending writes having an earlier point in time that have not completed, then control ends without returning complete so that the primary device 2 cannot copy the write until earlier in time writes are copied to their respective secondary storages 8 or volumes 22. In response to receiving log complete, the device driver 42/storage manager 46 may copy (at block 112) the logged write to the primary storage 4 and corresponding secondary storage 8 via the secondary device 6 managing access to the corresponding secondary storage 8.

In certain embodiments, the primary storage device 4 may write data synchronously, such that the write does not complete until the data is successfully copied to the corresponding secondary storage 8. In one embodiment, the write does not complete until the write data is stored in the secondary storage 8. In an alternative embodiment, the write may complete if the write data is stored in a cache of the secondary device 6 managing access to the corresponding secondary storage 8 before being written to the secondary storage 8.

Figure 5:
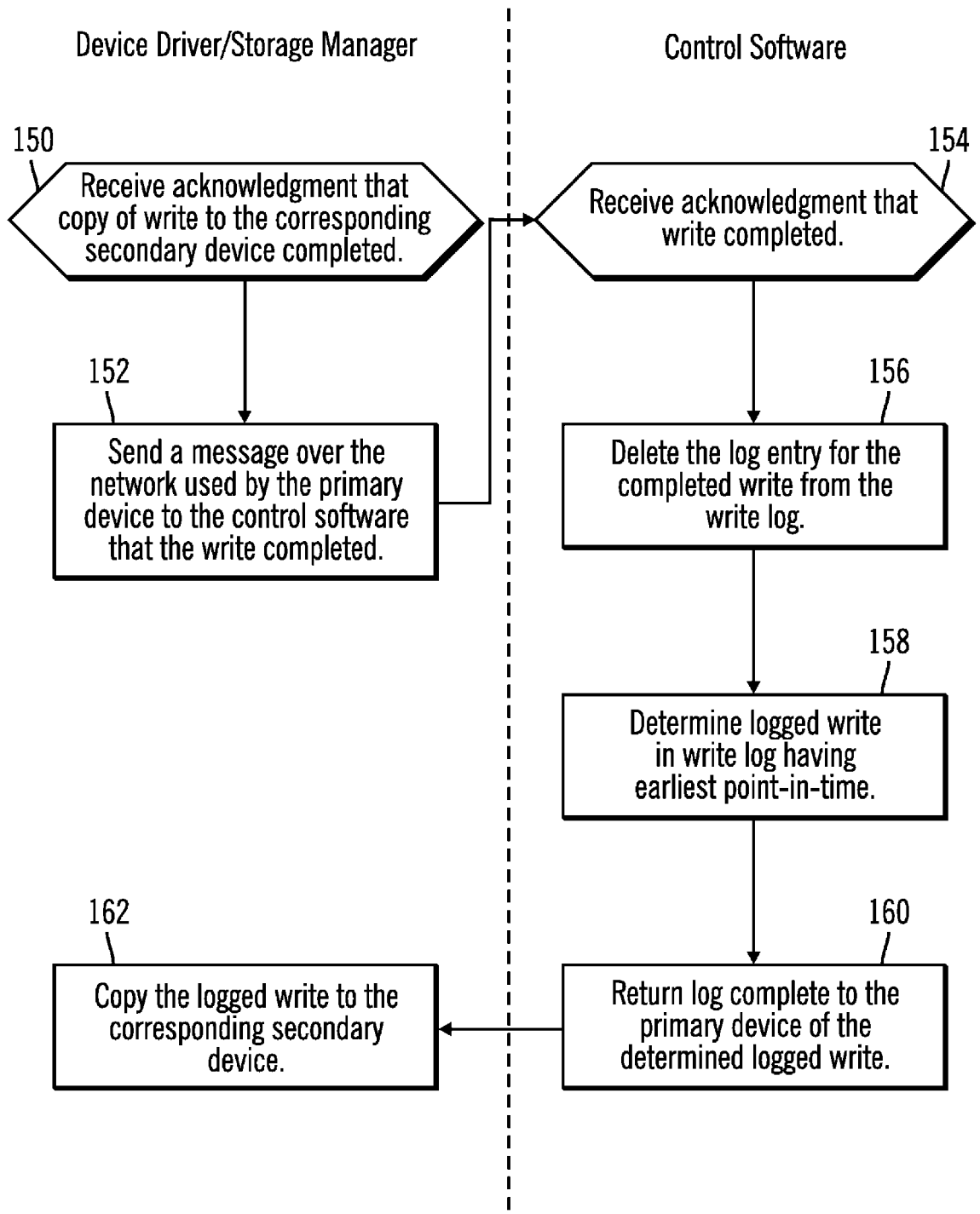
FIG. 5 illustrates an embodiment of operations to process an acknowledgment that a write completed.

FIG. 5 illustrates an embodiment of operations performed by the device driver 42/storage manager 46 in the primary devices 2, 12 in the first and second groups and the control software 28 to process completion of the write to the secondary storage 8. Upon the device driver 42/storage manager 46 receiving (at block 150) acknowledgment that the copying of the write to the corresponding secondary device completed, the device driver 42/storage manager 46 sends (at block 152) a message over the network 10, 24 used by the primary device to the control software 28 that the write completed. In response to receiving (at block 154) acknowledgment that a write completed, the control software 28 deletes (at block 156) the log entry 90 for the completed write from the write log 32. The control software 28 determines (at block 158) the logged write 90 in the write log 32 having an earliest point-in-time 96 (FIG. 3) and returns (at block 160) log complete to the primary device 2, 12 of the determined logged write, as indicated in field 92, to allow the primary device 2, 12 to copy the write to the secondary device 6, 18. These operations ensure that later writes to any of the primary storages 4 and volumes 16 in the first and second groups are not copied out of order to their corresponding secondary storage 8 or secondary volumes 22. In alternative embodiments, different techniques may be used to ensure that data is not written out of order, such as the use of extended long busy periods so that a primary device delays copying a write for an extended long busy period to allow other primary devices time to complete their earlier writes.

Figure 6:
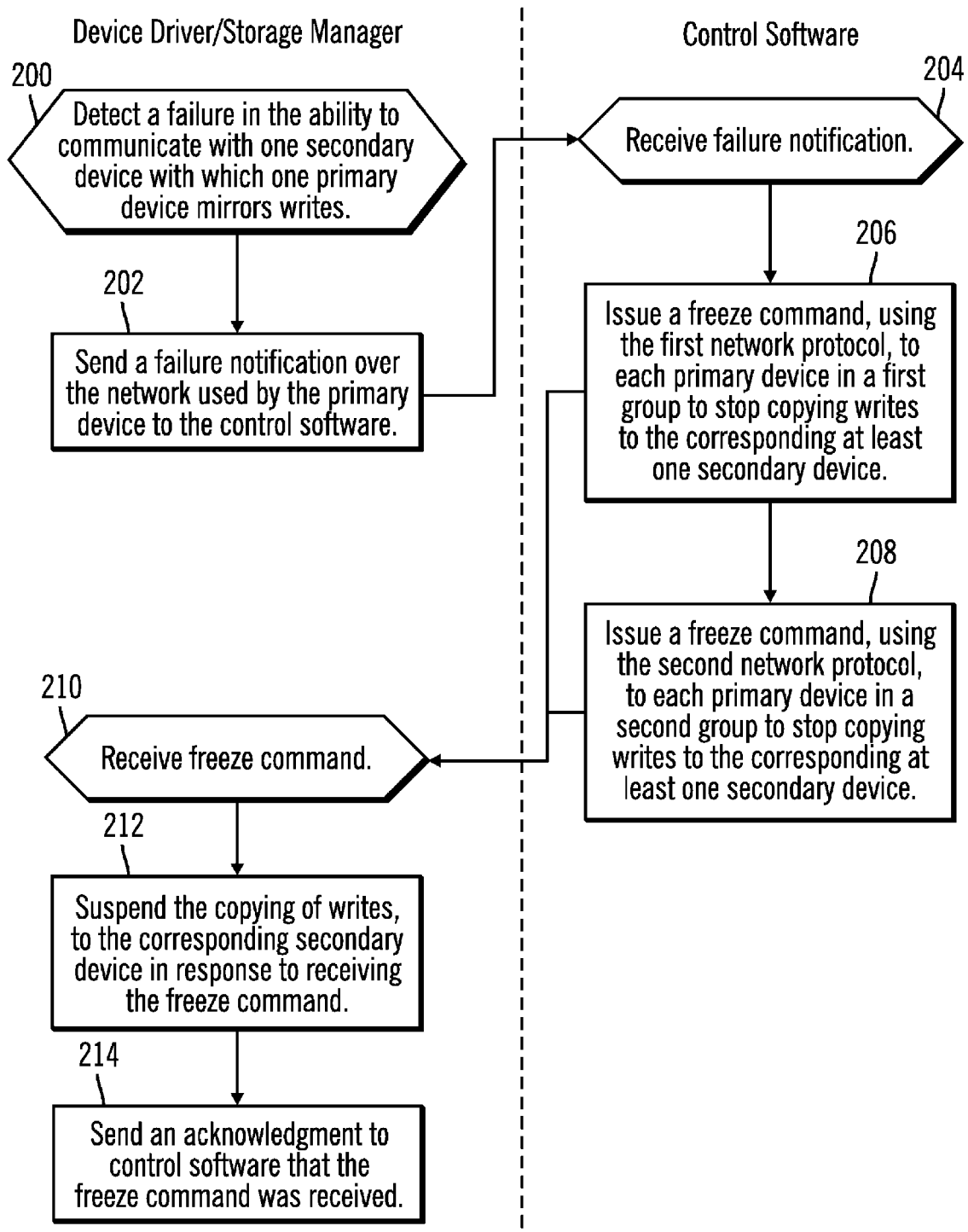
FIG. 6 illustrates an embodiment of operations to handle a failure in the availability of one secondary device.

FIG. 6 illustrates an embodiment of operations performed by the device driver 42/storage manager 46 in the primary devices 2, 12 in the first and second groups and the control software 28 to handle a failure notification indicating the inability of a primary device 2, 12 to communicate with a secondary device 6, 18. Upon detecting (at block 200) or being notified by the primary device 2 hardware of a failure in the ability of the primary device 2, 12 to communicate with a secondary device 6, 18, the device driver 42/storage manager 46 sends (at block 202) a failure notification over the network 10, 24 used by the primary device 2, 12 to the control software 28. The failure may be a result of a failure in the network connection between the primary device 2, 12 and secondary device 6, 18 or a failure at the secondary site, e.g., a failure of the secondary device 6, 18 or secondary storage 8, 20. Upon receiving (at block 204) failure notification, which may be from any of the primary devices 2, 12 in the first and second groups over the first 10 and second 24 networks, the control software 28 issues (at block 206) a freeze command, using the first network protocol, to each primary device 2 in the first group to stop copying writes to the secondary storage 8, 20. The control software 28 further issues (at block 208) a freeze command, using the second network protocol, to each primary device 12 in the second group to stop copying writes to the corresponding at least one secondary device. The control software 28 may determine the primary devices 72 (FIG. 2) and network protocols 82 to use from an entry 70 in the consistency group information 30.

Upon receiving (at block 210) a freeze command, the device driver 42/storage manager 46 suspends (at block 212) the copying of writes to the corresponding secondary storage 8 or secondary volume 22. The device driver 42/storage manager 46 sends (at block 214) an acknowledgment that the freeze command was received to the primary device 2, 12 that sent the freeze command.

Figure 7:
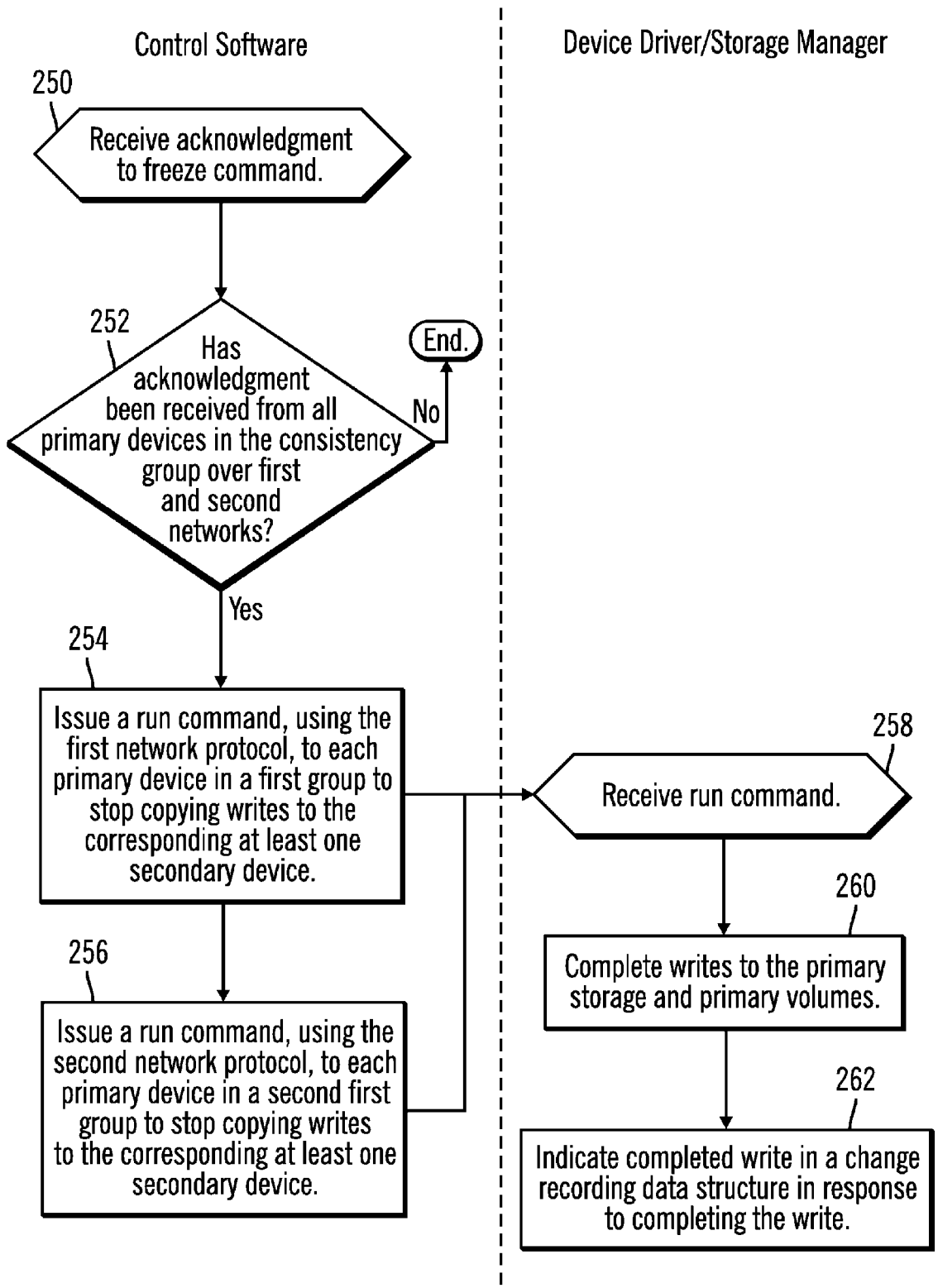
FIG. 7 illustrates an embodiment of operations to process the acknowledgment of receiving a freeze command.

With respect to FIG. 7, upon the control software 28 receiving (at block 250) acknowledgment of the freeze command from one of the primary devices 2, 12, the control software 28 determines (at block 252) whether acknowledgment has been received from all primary devices 2, 12 in the consistency group over the first 10 and second 24 networks. If not, control may end or take other appropriate action if acknowledgment is not received from all the primary devices 2, 12. Otherwise, if acknowledgment has been received from all the primary devices 2, 12, the control software 28 issues (at block 254) a run command, using the first network protocol, to each primary device 2, in the first group to stop copying writes to the corresponding secondary device 6, 18. The control software 28 issues (at block 256) a run command, using the second network protocol, to each primary device 12 in the second first group to stop copying writes to the corresponding secondary device 18. The control software 28 may determine the primary devices for the run command from the consistency group information 30.

Upon receiving (at block 258) a run command, the device driver 42/storage manager 46 completes writes (at block 260) to the primary storage 4 or primary volume 16 and indicates (at block 262) completed writes in a change recording data structure 50, 52. After the secondary device 6, 18 and/or storage 8, 20 recovers, the primary device 2, 12 may copy over those writes indicated in the change recording bitmap 50, 52 to synchronize the primary 4, 14 and secondary 8, 20 storages.

Described embodiments manage the copying of writes to primary storage or volumes to secondary storage or volumes that are distributed over different networks that use different network communication protocols. Further, described embodiments handle a failure at the secondary site by managing primary devices in different networks using different network protocols. Further embodiments maintain the data at secondary storages in different networks consistent as of a point-in-time.

ADDITIONAL EMBODIMENT DETAILS

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 4, 5, 6, and 7 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Figure 8:
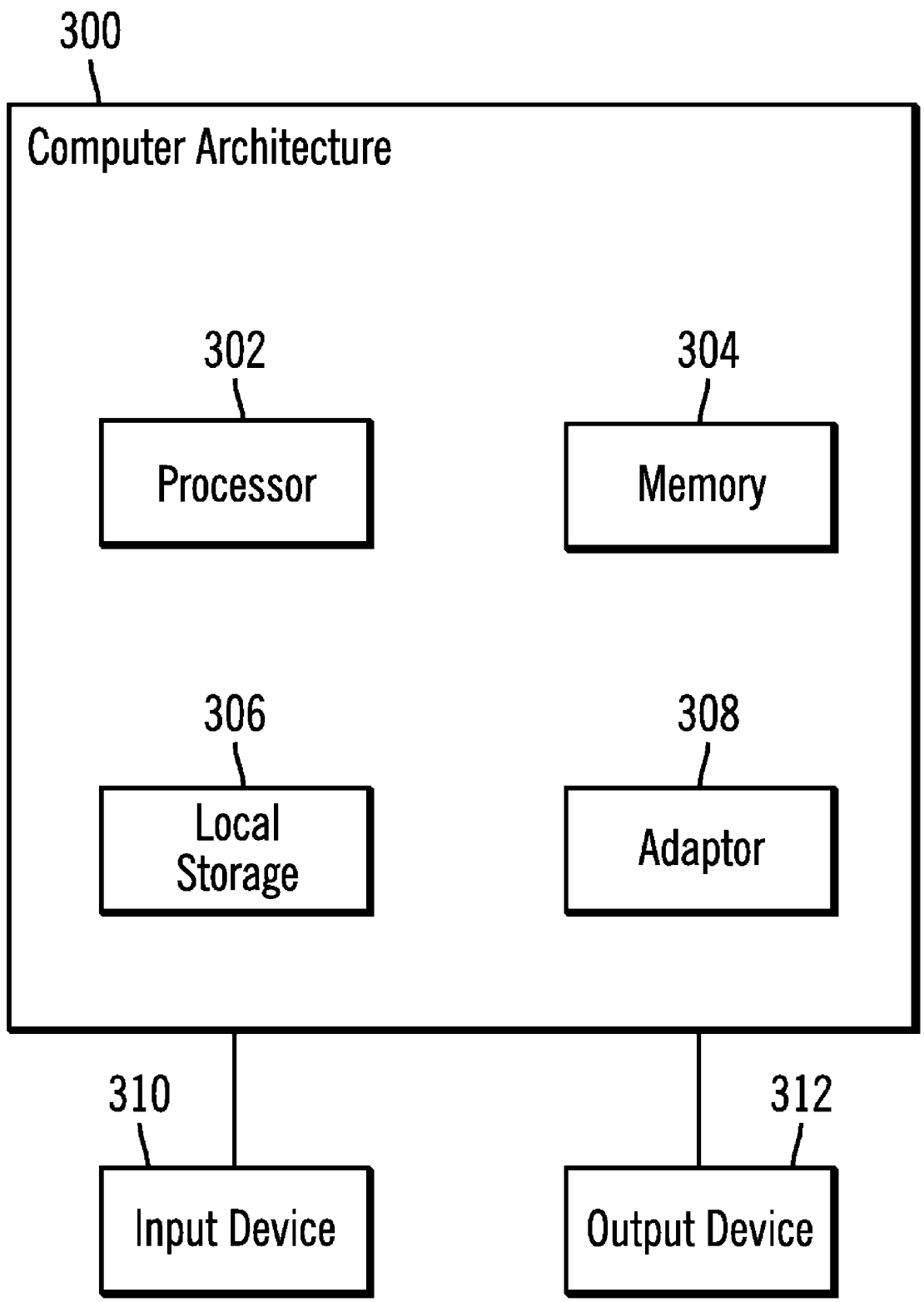
FIG. 8 illustrates a block diagram of a computer architecture in which certain described aspects of the embodiments are implemented

FIG. 8 illustrates an embodiment of computing system architecture 300 that may be implemented, in whole or in part, in the devices 2, 6, 12, 18, and 26 (FIG. 1). The architecture 300 may include one or more processors 302 (e.g., a microprocessor), a memory 304 (e.g., a volatile memory device), and storage 306 (e.g., a non-volatile storage, such as magnetic disk drives, optical disk drives, a tape drive, etc.). The storage 306 may comprise an internal storage device or an attached or network accessible storage. Programs in the storage 306 are loaded into the memory 304 and executed by the processor(s) 302 in a manner known in the art. The architecture further includes one or more adaptors 308 to enable communication over a network. An input device 310 may be used to provide user input to the processor 302, and may include a keyboard, mouse, pen-stylus, microphone, touch sensitive display screen, or any other activation or input mechanism known in the art. An output device 312 is capable of rendering information transmitted from the processor 302, or other component, such as a display monitor, printer, storage, etc.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   communicating, using a first network protocol, a first failure notification from a first primary device in a first group of at least one first primary device and at least one corresponding first primary storage managed by the at least one first primary device to a control system in response to the first primary device determining that a first write to the first primary storage cannot be copied to a corresponding first secondary storage;
   communicating, using a second network protocol, a second failure notification from a second primary device in a second group of at least one second primary device and at least one corresponding second primary storage managed by the at least one second primary device to the control system in response to the second primary device determining that a second write to the corresponding second primary storage cannot be copied to a corresponding second secondary storage;
   receiving, from the control system using the first network protocol, a first freeze command, sent by the control software in response to the first failure notification, at the at least one first primary device in the first group;
   receiving, from the control system using the second network protocol, a second freeze command, sent by the control software in response to the second failure notification, at the at least one first primary device in the second group; and
   suspending the copying of writes from the first and second primary storages in the first and second groups to the corresponding first and second secondary storages in response to receiving the first and second freeze commands, respectively.

2. The method of claim 1, further comprising:
   copying writes to the first and second primary storages in the first and second groups such that an order of dependent writes to any of the first and second primary storages in the first and second groups is preserved in the copy of the dependent writes to the corresponding first and second secondary storages.

3. The method of claim 2, wherein the data is copied synchronously from the first and second primary devices in the first and second groups to the corresponding first and second secondary storages such that the writes to the first and second primary storages in the first and second groups do not complete until acknowledgment is received that the writes have completed at the corresponding first and second secondary storages.

4. The method of claim 1, further comprising:
   sending a first write complete message over the first network to the control system using the first network protocol in response to completing copying a first write to the corresponding first secondary storage;
   sending a second write complete message over the second network to the control system using the second network protocol in response to completing copying a second write to the corresponding second secondary storage.

5. The method of claim 1, wherein the at least one first primary device and first primary storage in the first group comprise heterogeneous devices with respect to the at least one second primary device and the at least one second primary storage in the second group, and wherein the first and second groups have heterogeneous first and second storage manager programs to perform the operations of communicating the first and second failure notifications, receiving the first and second freeze commands, and suspending the copying of the writes.

6. A method, comprising:
   communicating, using a first network protocol, a first failure notification from a first primary device in a first group of at least one first primary device and at least one corresponding first primary storage managed by the at least one first primary device to a control system in response to the first primary device determining that a first write to the first primary storage cannot be copied to a corresponding first secondary storage;
   communicating, using a second network protocol, a second failure notification from a second primary device in a second group of at least one second primary device and at least one corresponding second primary storage managed by the at least one second primary device to the control system in response to the second primary device determining that a second write to the corresponding second primary storage cannot be copied to a corresponding second secondary storage;
   receiving, from the control system using the first network protocol, a first freeze command at the at least one first primary device in the first group;
   receiving, from the control system using the second network protocol, a second freeze command at the at least one first primary device in the second group;
   suspending the copying of writes from the first and second primary storages in the first and second groups to the corresponding first and second secondary storages in response to receiving the first and second freeze commands, respectively;
   receiving a first write request, by one of the first primary devices in the first group;
   sending a first message using the first network protocol over the first network to log the write to the control system, wherein the first primary device in the first group does not copy the first write to the corresponding first secondary storage until receiving acknowledgment from the control system over the first network that the first write was logged;
   receiving a second write request, by one of the second primary devices in the second group;

sending a second message using the second network protocol over the second network to log the second write to the control system, wherein the second primary device in the second group does not copy the second write to the corresponding second secondary storage until receiving acknowledgment from the control system over the second network that the second write was logged; and wherein the first and second primary devices in the first and second groups do not copy dependent writes to their corresponding first and second secondary storages before writes having an earlier point-in-time are copied by the first and second primary devices in the first and second groups to their corresponding first and second secondary storages.

7. A method, comprising:

communicating, using a first network protocol, a first failure notification from a first primary device in a first group of at least one first primary device and at least one corresponding first primary storage managed by the at least one first primary device to a control system in response to the first primary device determining that a first write to the first primary storage cannot be copied to a corresponding first secondary storage;

communicating, using a second network protocol, a second failure notification from a second primary device in a second group of at least one second primary device and at least one corresponding second primary storage managed by the at least one second primary device to the control system in response to the second primary device determining that a second write to the corresponding second primary storage cannot be copied to a corresponding second secondary storage;

receiving, from the control system using the first network protocol, a first freeze command at the at least one first primary device in the first group;

receiving, from the control system using the second network protocol, a second freeze command at the at least one first primary device in the second group;

suspending the copying of writes from the first and second primary storages in the first and second groups to the corresponding first and second secondary storages in response to receiving the first and second freeze commands, respectively;

sending a first acknowledgment to the control system that the first freeze command was received over the first network using the first network protocol in response to receiving the first freeze command;

sending a second acknowledgment to the control system that the second freeze command was received over the first network using the second network protocol in response to receiving the second freeze command;

receiving a first run command from the control system using the first network protocol in response to the control system receiving the first and second acknowledgments that the first and second freeze commands were received from all the first and second primary devices in the first and second groups, respectively;

receiving a second run command from the control system using the second network protocol in response to the control system receiving the first and second acknowledgments that the first and second freeze commands were received from all the first and second primary devices in the first and second groups, respectively;

completing writes to the corresponding first and second primary storages in the first and second groups in response to receiving the first and second run commands, respectively; and indicating one completed write in a change recording data structure in response to completing one of the writes.

8. A system operable with a control system, a first network, a second network, and secondary storages, comprising:

a first group of at least one first primary device and at least one corresponding first primary storage, wherein writes to one of the at least one corresponding first primary storage in the first group are copied to at least one corresponding first secondary storage;

a second group of at least one second primary device and at least one corresponding second primary storage, wherein writes to the at least one corresponding second primary storage in the second group are copied to at least one corresponding second secondary storage;

a first storage manager, executed by the at least one first primary device in the first group, to cause the at least one first primary device in the first group to perform operations, the operations comprising:

communicating, using a first network protocol, a first failure notification over the first network to the control system in response to the first primary device in the first group determining that a first write to the corresponding first primary storage cannot be copied to the corresponding first secondary storage;

receiving, from the control system using the first network protocol, a first freeze command, sent by the control software in response to the first failure notification, at the at least one first primary device in the first group;

suspending the copying of writes from the at least one corresponding first primary storage in the first group to the at least one corresponding first secondary storage in response to receiving the first freeze command from the control system; and a second storage manager, executed by the at least one second primary device in the second group, to cause the at least one second primary device in the second group to perform operations, the operations comprising:

communicating, using a second network protocol, a second failure notification over the second network to the control system in response to the second primary device in the second group determining that a second write to the corresponding second primary storage cannot be copied to the corresponding second secondary storage;

receiving, from the control system using the second network protocol, a second freeze command, sent by the control software in response to the second failure notification, at the at least one second primary device in the second group; and suspending the copying of writes from the at least one corresponding second primary storage in the second group to the at least one corresponding second secondary storage in response to receiving the second freeze command from the control system.

9. The system of claim 8, wherein the first and second storage managers are further executed to cause operations comprising:

copying writes to the first and second primary storages in the first and second groups such that an order of dependent writes to any of the first and second primary storages in the first and second groups is preserved in the copy of the dependent writes to the corresponding first and second secondary devices.

10. The system of claim 9, wherein the first and second primary devices in the first and second groups copy the data synchronously to the corresponding first and second secondary devices such that the writes to the first and second primary storages in the first and second groups do not complete until acknowledgment is received that the writes have completed at the corresponding first and second secondary storages.

11. The system of claim 8, further comprising:
wherein the first storage manager is further executed to send a first write complete message over the first network to the control system using the first network protocol in response to completing copying the first write to the corresponding first secondary device;
wherein the second storage manager is further executed to send a second write complete message over the second network to the control system using the second network protocol in response to completing copying the second write to the corresponding second secondary device.

12. The system of claim 8, wherein the first primary device and the at least one first primary storage in the first group comprise heterogeneous devices with respect to the second primary device and the at least one second primary storage in the second group, and wherein the first and second groups have heterogeneous first and second storage manager programs to perform the operations of communicating the first and second failure notifications, receiving the first and second freeze commands, and suspending the copying of the writes.

13. A system operable with a control system, a first network, a second network, and secondary storages, comprising:
a first group of at least one first primary device and at least one corresponding first primary storage, wherein writes to one of the at least one corresponding first primary storage in the first group are copied to at least one corresponding first secondary storage;
a second group of at least one second primary device and at least one corresponding second primary storage, wherein writes to the at least one corresponding second primary storage in the second group are copied to at least one corresponding second secondary storage;
a first storage manager, executed by the at least one first primary device in the first group, to cause the at least one first primary device in the first group to perform operations, the operations comprising:
communicating, using a first network protocol, a first failure notification over the first network to the control system in response to the first primary device in the first group determining that a first write to the corresponding first primary storage cannot be copied to the corresponding first secondary storage;
receiving, from the control system using the first network protocol, a first freeze command at the at least one first primary device in the first group;
suspending the copying of writes from the at least one corresponding first primary storage in the first group to the at least one corresponding first secondary storage in response to receiving the first freeze command from the control system;
receiving a first write request;
sending a first message over the first network to log the first write to the control system using the first network protocol, wherein the first primary device in the first group does not copy the first write to the corresponding first secondary device until receiving a first acknowledgment from the control system over the first network that the first write was logged; and
a second storage manager, executed by the at least one second primary device in the second group, to cause the at least one second primary device in the second group to perform operations, the operations comprising:
communicating, using a second network protocol, a second failure notification over the second network to the control system in response to the second primary device in the second group determining that a second write to the corresponding second primary storage cannot be copied to the corresponding second secondary storage;
receiving, from the control system using the second network protocol, a second freeze command at the at least one second primary device in the first group;
suspending the copying of writes from the at least one corresponding second primary storage in the second group to the at least one corresponding second secondary storage in response to receiving the second freeze command from the control system;
receiving a second write request;
sending a second message over the second network to log the second write to the control system using the second network protocol, wherein the second primary device in the second group does not copy the second write to the corresponding second secondary device until receiving a second acknowledgment from the control system over the second network that the second write was logged; and
wherein the first and second storage managers are further executed to coordinate with the control system to cause the first and second primary devices in the first and second groups to not copy dependent writes to their corresponding first and second secondary devices before writes having an earlier point-in-time are copied by the first and second primary devices in the first and second groups to their corresponding first and second secondary devices.

14. A system operable with a control system, a first network, a second network, and secondary storages, comprising:
a first group of at least one first primary device and at least one corresponding first primary storage, wherein writes to one of the at least one corresponding first primary storage in the first group are copied to at least one corresponding first secondary storage;
a second group of at least one second primary device and at least one corresponding second primary storage, wherein writes to the at least one corresponding second primary storage in the second group are copied to at least one corresponding second secondary storage;
a first storage manager, executed by the at least one first primary device in the first group, to cause the at least one first primary device in the first group to perform operations, the operations comprising:
communicating, using a first network protocol, a first failure notification over the first network to the control system in response to the first primary device in the first group determining that a first write to the corresponding first primary storage cannot be copied to the corresponding first secondary storage;
receiving, from the control system using the first network protocol, a first freeze command at the at least one first primary device in the first group;
suspending the copying of writes from the at least one corresponding first primary storage in the first group to the at least one corresponding first secondary storage in response to receiving the first freeze command from the control system;
sending a first acknowledgment to the control system that the first freeze command was received over the first network using the first network protocol in response to receiving the first freeze command; and receiving a first run command from the control system using the first network protocol in response to the control system receiving the first and second acknowledgments that the first and second freeze commands were received from the first and second primary devices in the first and second groups;

completing writes in response to receiving the first run command; and indicating one completed write in a change recording data structure in response to completing one of the writes; and a second storage manager, executed by the at least one second primary device in the second group, to cause the at least one second primary device in the second group to perform operations, the operations comprising:

communicating, using a second network protocol, a second failure notification over the second network to the control system in response to the second primary device in the second group determining that a second write to the corresponding second primary storage cannot be copied to the corresponding second secondary storage;

receiving, from the control system using the second network protocol, a second freeze command at the at least one second primary device in the first group;

suspending the copying of writes from the at least one corresponding second primary storage in the second group to the at least one corresponding second secondary storage in response to receiving the second freeze command from the control system;

sending a second acknowledgment to the control system that the second freeze command was received over the second network using the second network protocol in response to receiving the second freeze command;

receiving a second run command from the control system using the second network protocol in response to the control system receiving the a first and second acknowledgments that the first and second freeze commands were received from the first and second primary devices in the first and second groups;

completing writes in response to receiving the second run command; and indicating one completed write in a change recording data structure in response to completing one of the writes.

15. An article of manufacture including at least one computer readable media including a first storage manager and a second storage manager, wherein the first storage manager is executed by at least one first primary device in a first group also including at least one corresponding first primary storage, wherein writes to the at least one corresponding first primary storage in the first group are copied to a corresponding first secondary storage, wherein the second storage manager is executed by at least one second primary device in a second group also including at least one corresponding second primary storage, wherein writes to the at least one corresponding second primary storage in the second group are copied to a corresponding second secondary storage, wherein the first and second storage managers are executed to communicate with a control system and to cause operations, the operations comprising:

communicating, by the first storage manager, a first failure notification using a first network protocol to the control system in response to determining that a first write to the first primary storage cannot be copied to a corresponding secondary storage;

communicating, by the second storage manager, a second failure notification using a second network protocol to the control system in response to determining that a second write to the corresponding second primary storage cannot be copied to a corresponding second secondary storage;

receiving, by the first storage manager, from the control system using the first network protocol, a first freeze command, sent by the control software in response to the first failure notification, at the at least one first primary device in the first group;

receiving, by the second storage manager, from the control system using the second network protocol, a second freeze command, sent by the control software in response to the second failure notification, at the at least one second primary device in the second group; and suspending the copying of writes, by the first and second storage managers, from the first and second primary storages in the first and second groups to the corresponding first and second secondary storages in response to receiving the first and second freeze commands.

16. The article of manufacture of claim 15, further comprising:

copying, by the first and second storage managers, writes to the first and second primary storages such that an order of dependent writes to any of the first and second primary storages in the first and second groups is preserved in the copy of the dependent writes to the corresponding first and second secondary storages.

17. The article of manufacture of claim 16, wherein the first and second storage managers in the first and second groups copy the data synchronously to the corresponding first and second secondary storages such that the writes to the first and second primary storages in the first and second groups do not complete until acknowledgment is received that the writes have completed at the corresponding first and second secondary storages.

18. The article of manufacture of claim 15, further comprising:

sending, by the first storage manager, a first write complete message over the first network to the control system using the first network protocol in response to completing copying the first write to the corresponding first secondary storage;

sending, by the second storage manager, a second write complete message over the second network to the control system using the second network protocol in response to completing copying the second write to the corresponding second secondary storage.

19. The article of manufacture of claim 15, wherein the at least one first primary device and first primary storage in the first group comprise heterogeneous devices with respect to the at least one second primary device and the at least one second primary storage in the second group, and wherein the first and second storage managers comprise heterogeneous first and second storage manager programs to perform the operations of communicating the first and second failure notifications, receiving the first and second freeze commands, and suspending the copying of the writes.

20. An article of manufacture including at least one computer readable media including a first storage manager and a second storage manager, wherein the first storage manager is executed by at least one first primary device in a first group also including at least one corresponding first primary storage, wherein writes to the at least one corresponding first primary storage in the first group are copied to a corresponding first secondary storage, wherein the second storage manager is executed by at least one second primary device in a second group also including at least one corresponding second primary storage, wherein writes to the at least one corresponding second primary storage in the second group are copied to a corresponding second secondary storage, wherein the first and second storage managers are executed to communicate with a control system and to cause operations, the operations comprising:

communicating, by the first storage manager, a first failure notification using a first network protocol to the control system in response to determining that a first write to the first primary storage cannot be copied to a corresponding secondary storage;

communicating, by the second storage manager, a second failure notification using a second network protocol to the control system in response to determining that a second write to the corresponding second primary storage cannot be copied to a corresponding second secondary storage;

receiving, by the first storage manager, from the control system using the first network protocol, a first freeze command at the at least one first primary device in the first group;

receiving, by the second storage manager, from the control system using the second network protocol, a second freeze command at the at least one second primary device in the second group;

suspending the copying of writes, by the first and second storage managers, from the first and second primary storages in the first and second groups to the corresponding first and second secondary storages in response to receiving the first and second freeze commands;

receiving, by the first and second storage managers, first and second write requests, respectively;

sending, by first storage manager, a first message over the first network to log the first write to the control system using the first network protocol, wherein the first storage manager does not copy the first write to the corresponding first secondary storage until receiving a first acknowledgment from the control system over the first network that the first write was logged;

sending, by the second storage manager, a second message over the second network to log the second write to the control system using the second network protocol, wherein the second storage manager does not copy the second write to the corresponding second secondary storage until receiving a second acknowledgment from the control system over the second network that the second write was logged; and wherein the first and second storage managers do not copy dependent writes to their corresponding first and second secondary storages before writes having an earlier point-in-time are copied to their corresponding first and second secondary storages.

21. An article of manufacture including at least one computer readable media including a first storage manager and a second storage manager, wherein the first storage manager is executed by at least one first primary device in a first group also including at least one corresponding first primary storage, wherein writes to the at least one corresponding first primary storage in the first group are copied to a corresponding first secondary storage, wherein the second storage manager is executed by at least one second primary device in a second group also including at least one corresponding second primary storage, wherein writes to the at least one corresponding second primary storage in the second group are copied to a corresponding second secondary storage, wherein the first and second storage managers are executed to communicate with a control system and to cause operations, the operations comprising:

communicating, by the first storage manager, a first failure notification using a first network protocol to the control system in response to determining that a first write to the first primary storage cannot be copied to a corresponding secondary storage;

communicating, by the second storage manager, a second failure notification using a second network protocol to the control system in response to determining that a second write to the corresponding second primary storage cannot be copied to a corresponding second secondary storage;

receiving, by the first storage manager, from the control system using the first network protocol, a first freeze command at the at least one first primary device in the first group;

receiving, by the second storage manager, from the control system using the second network protocol, a second freeze command at the at least one second primary device in the second group;

suspending the copying of writes, by the first and second storage managers, from the first and second primary storages in the first and second groups to the corresponding first and second secondary storages in response to receiving the first and second freeze commands;

sending, by the first storage manager, a first acknowledgment to the control system that the first freeze command was received over the first network using the first network protocol in response to receiving the first freeze command;

sending, by the second storage manager, a second acknowledgment to the control system that the second freeze command was received over the first second network using the second network protocol in response to receiving the second freeze command;

receiving, by the first storage manager, a first run command from the control system using the first network protocol in response to the control system receiving the first and second acknowledgments that the first and second freeze commands were received from all the first and second primary devices in the first and second groups;

receiving, by the second storage manager, a second run command from the control system using the second network protocol in response to the control system receiving the first and second acknowledgments that the first and second freeze commands were received from all the first and second primary devices in the first and second groups;

completing, by the first and second storage managers, writes to the first and second primary devices to the corresponding first and second primary storages in the first and second groups in response to receiving the first and second run commands; and indicating, by the first and second storage managers, one completed write in a change recording data structure in response to completing the write.

* * * * *